United States Patent
Tsuchida et al.

(10) Patent No.: US 12,126,030 B2
(45) Date of Patent: Oct. 22, 2024

(54) FUEL-CELL CELL

(71) Applicant: Panasonic Intellectual Property Management Co., Ltd., Osaka (JP)

(72) Inventors: Shuzo Tsuchida, Nara (JP); Ryouhei Seki, Tokyo (JP); Tsutomu Kawashima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 627 days.

(21) Appl. No.: 17/414,100

(22) PCT Filed: Nov. 29, 2019

(86) PCT No.: PCT/JP2019/046818
§ 371 (c)(1),
(2) Date: Jun. 15, 2021

(87) PCT Pub. No.: WO2020/129575
PCT Pub. Date: Jun. 25, 2020

(65) Prior Publication Data
US 2022/0052351 A1    Feb. 17, 2022

(30) Foreign Application Priority Data
Dec. 17, 2018   (JP) ................ 2018-235798

(51) Int. Cl.
*H01M 4/92* (2006.01)
*H01M 8/1004* (2016.01)
*H01M 8/10* (2016.01)

(52) U.S. Cl.
CPC ......... *H01M 4/926* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

| 5,350,643 A | 9/1994 | Imahashi et al. |
| 2003/0104267 A1* | 6/2003 | Haridoss ........... H01M 8/04291 429/433 |

(Continued)

FOREIGN PATENT DOCUMENTS

| CN | 101496206 | 7/2009 |
| EP | 1 968 147 | 9/2008 |

(Continued)

OTHER PUBLICATIONS

Japanese Office Action issued Jul. 25, 2023 in corresponding Japanese Patent Application No. 2020-561252, with English machine translation.

(Continued)

*Primary Examiner* — Alix E Eggerding
(74) *Attorney, Agent, or Firm* — Wenderoth, Lind & Ponack, L.L.P.

(57) ABSTRACT

A fuel-cell cell capable of reducing elution of particles with a catalytic function into the electrolyte membrane is provided. A fuel-cell cell according to the present disclosure includes an electrolyte membrane, a cathode catalyst layer laminated on a first main surface side of the electrolyte membrane, a cathode gas diffusion layer laminated on the cathode catalyst layer, an anode catalyst layer laminated on a second surface side of the electrolyte membrane, and an anode gas diffusion layer laminated on the anode catalyst layer. The cathode catalyst layer includes a cathode catalyst in which catalyst particles with a catalytic function are carried on a carrier, and the cathode catalyst includes a water-repellent polymer material in at least part of a surface thereof.

7 Claims, 4 Drawing Sheets

(56) References Cited

U.S. PATENT DOCUMENTS

| | | | |
|---|---|---|---|
| 2007/0184334 A1 | 8/2007 | Hong et al. | |
| 2008/0187792 A1 | 8/2008 | Yamada et al. | |
| 2009/0239116 A1* | 9/2009 | Okumura | H01M 4/8828 |
| | | | 429/513 |
| 2012/0282537 A1* | 11/2012 | Ohma | H01M 4/8642 |
| | | | 429/437 |
| 2012/0301809 A1 | 11/2012 | Mitsuta et al. | |
| 2012/0321989 A1 | 12/2012 | Tanuma | |
| 2015/0104728 A1* | 4/2015 | Dale | H01M 8/1004 |
| | | | 429/483 |
| 2015/0129431 A1* | 5/2015 | Winther-Jensen | |
| | | | H01M 4/8605 |
| | | | 205/630 |
| 2017/0033369 A1* | 2/2017 | Burton | H01M 4/8814 |

FOREIGN PATENT DOCUMENTS

| | | |
|---|---|---|
| EP | 2 549 570 | 1/2013 |
| JP | 6-52871 | 2/1994 |
| JP | 10-270054 | 10/1998 |
| JP | 2005-259650 | 9/2005 |
| JP | 2006-302578 | 11/2006 |
| JP | 2007-209979 | 8/2007 |
| JP | 2008-210793 | 9/2008 |
| JP | 2009-218184 | 9/2009 |
| JP | 2014-165148 | 9/2014 |
| KR | 10-0645832 | 11/2006 |
| WO | 2011/096355 | 8/2011 |
| WO | 2011/114949 | 9/2011 |

OTHER PUBLICATIONS

International Preliminary Report on Patentability and Written Opinion issued Mar. 3, 2020 in International (PCT) Application No. PCT/JP2019/046818, with English translation.

International Search Report issued Mar. 3, 2020 in International (PCT) Application No. PCT/JP2019/046818.

Office Action dated Mar. 13, 2024 in corresponding Chinese Patent Application No. 201980083461.0 with English-language translation.

* cited by examiner

| | COMPARATIVE EXAMPLE 1 | EXAMPLE 1 | EXAMPLE 2 | EXAMPLE 3 |
|---|---|---|---|---|
| CATALYST LAYER CONTACT ANGLE (°) | 0~20 | 80~120 | 80~120 | 100~120 |
| GDL CONTACT ANGLE (°) | 120~160 | 120~160 | 120~160 | 120~160 |
| CONTENT OF FLUORINE-BASED POLYMER MATERIAL (%) | 0 | 5~15 | 5~15 | 15~30 |
| INITIAL POWER VOLTAGE (mV) | 781 | 787 | 774 | 765 |
| POWER VOLTAGE AFTER ENDURANCE (mV) | 757 | 767 | 759 | 745 |
| AMOUNT OF VOLTAGE CHANGE IN DURABILITY TEST (mV) | 24 | 20 | 15 | 20 |
| VOLTAGE CHANGE RATE IN DURABILITY TEST (%) | 96.9 | 97.5 | 98.1 | 97.4 |
| INITIAL CHARACTERISTICS | ◎ | ◎ | ◎ | ○ |
| DURABILITY | × | ○ | ◎ | ○ |

FUEL-CELL CELL

TECHNICAL FIELD

The present disclosure relates to a fuel-cell cell.

BACKGROUND ART

Solid polymer type and other types of fuel cells are expected as next-generation power generation systems. The solid polymer fuel cell in particular is expected to be used as a power source for homes and automobiles from advantages of low operating temperature and compactness as compared with the other types of fuel cells.

With the spread of fuel cells in recent years, a number of studies have been made to improve durability of a catalyst layer of the solid polymer fuel cell.

Figure 6:
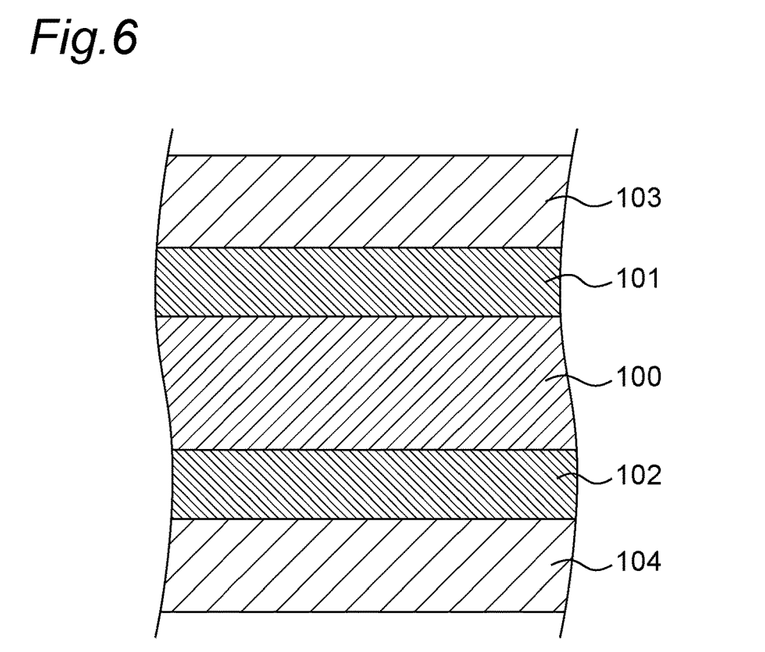
FIG. 6 is a schematic view of a fuel-cell cell in a conventional art document.

The following mechanism has been announced as one of factors of deterioration in the fuel cell performance. Reference will be made to FIG. 6 for description. FIG. 6 is a sectional view showing a schematic configuration of a power generation region of a fuel-cell cell. An anode catalyst layer 101 and a cathode catalyst layer 102 are formed on both surfaces of an electrolyte membrane 100. A gas diffusion layer (abbreviated as GDL) is formed outside in the thickness direction of each of the anode catalyst layer 101 and the cathode catalyst layer 102. The fuel-cell cell generates electricity by supplying hydrogen and air via the GDL to the anode catalyst layer 101 and the cathode catalyst layer 102.

At this time, a potential is generated across the anode catalyst layer 101 and the cathode catalyst layer 102. By turning on/off power generation, the potential varies when stopping power generation from the power generation state or when starting power generation from the power generation stop state. The potential variation brings about elution of platinum ions (Pt ions) from platinum or platinum alloy particles of catalyst included in the cathode catalyst layer 102 and movement thereof to the electrolyte membrane 100. Platinum ions are then reduced in the electrolyte membrane 100 to form, within the interior of the electrolyte membrane 100, a region (Pt band) in which platinum fine particles are present.

For example, Patent Document 1 discloses that Pt in the electrolyte membrane 100 adversely affects the durability of the electrolyte membrane 100. To improve the durability of the electrolyte membrane 100, a technique has been disclosed for shifting the location of generation of the Pt band by controlling the partial pressure of gas in the anode catalyst layer 101 and the cathode catalyst layer 102.

PATENT DOCUMENT

Patent Document 1: JP 2006-302578 A

SUMMARY OF THE INVENTION

Since in the method of Patent Document 1 catalyst (platinum) elutes from the cathode catalyst layer 102 and moves into the electrolyte membrane 100, the amount of platinum of the cathode catalyst layer 102 decreases. This may cause a problem that the power generation performance as a fuel cell deteriorates, such as a significant drop of the generated power voltage for example.

An object of the present disclosure is to provide a fuel-cell cell capable of reducing elution of particles with a catalytic function into the electrolyte membrane.

A fuel-cell cell of the present disclosure includes: an electrolyte membrane; a cathode catalyst layer laminated on a first main surface side of the electrolyte membrane; a cathode gas diffusion layer laminated on the cathode catalyst layer; an anode catalyst layer laminated on a second surface side of the electrolyte membrane; and an anode gas diffusion layer laminated on the anode catalyst layer. The cathode catalyst layer includes a cathode catalyst in which catalyst particles with a catalytic function are carried on a carrier, and the cathode catalyst includes a water-repellent polymer material in at least part of a surface thereof.

According to the present disclosure, there can be provided a fuel-cell cell capable of reducing elution of particles with a catalytic function into the electrolyte membrane.

EMBODIMENT(S) FOR CARRYING OUT THE INVENTION

A fuel-cell cell according to the first aspect of the present disclosure, includes: an electrolyte membrane; a cathode catalyst layer laminated on a first main surface side of the electrolyte membrane; a cathode gas diffusion layer laminated on the cathode catalyst layer; an anode catalyst layer laminated on a second surface side of the electrolyte membrane; and an anode gas diffusion layer laminated on the anode catalyst layer. The cathode catalyst layer includes a cathode catalyst in which catalyst particles with a catalytic function are carried on a carrier, and the cathode catalyst includes a water-repellent polymer material in at least part of a surface thereof.

The fuel-cell cell according to the second aspect of the present disclosure in the first aspect, wherein the cathode catalyst layer includes: a first catalyst layer, and a second catalyst layer positioned closer to the electrolyte membrane than the first catalyst layer, and the catalyst particles of the cathode catalyst included in the first catalyst layer have a particle diameter larger than that of the catalyst particles of the cathode catalyst included in the second catalyst layer.

The fuel-cell cell according to the third aspect of the present disclosure in the first or second aspect, wherein the cathode gas diffusion layer has a water contact angle of 120 degrees or more on a surface in contact with the cathode catalyst layer.

The fuel-cell cell according to the fourth aspect of the present disclosure in any one of the first to third aspects, wherein the cathode catalyst layer has a water contact angle of 0 degrees or more and 120 degrees or less on a surface in contact with the cathode gas diffusion layer.

The fuel-cell cell according to the fifth aspect of the present disclosure in any one of the first to fourth aspects, wherein a water contact angle on a surface of the cathode gas diffusion layer in contact with the cathode catalyst layer is larger than the water contact angle on a surface of the cathode catalyst layer in contact with the cathode gas diffusion layer.

The fuel-cell cell according to the sixth aspect of the present disclosure in any one of the first to fifth aspects, wherein the cathode catalyst layer has a thickness of 3 μm or more and 30 μm or less.

The fuel-cell cell according to the seventh aspect of the present disclosure in any one of the first to sixth aspects, wherein a power generation driving condition is 5% or more and 70% or less in relative humidity.

A fuel cell according to the eighth aspect of the present disclosure, includes a plurality of fuel-cell cells according to any one of the first to seventh aspects.

An embodiment of the present disclosure will now be described with reference to the accompanying drawings. In all figures below, the same or equivalent parts are given the same reference numerals and duplicate explanations thereof will be omitted. Although the embodiment of the present disclosure is described in detail hereinbelow, the present disclosure is not limited to the following description but can variously be modified and carried out without departing from its gist.

EMBODIMENT

Structure of Fuel-Cell Cell

Figure 1:
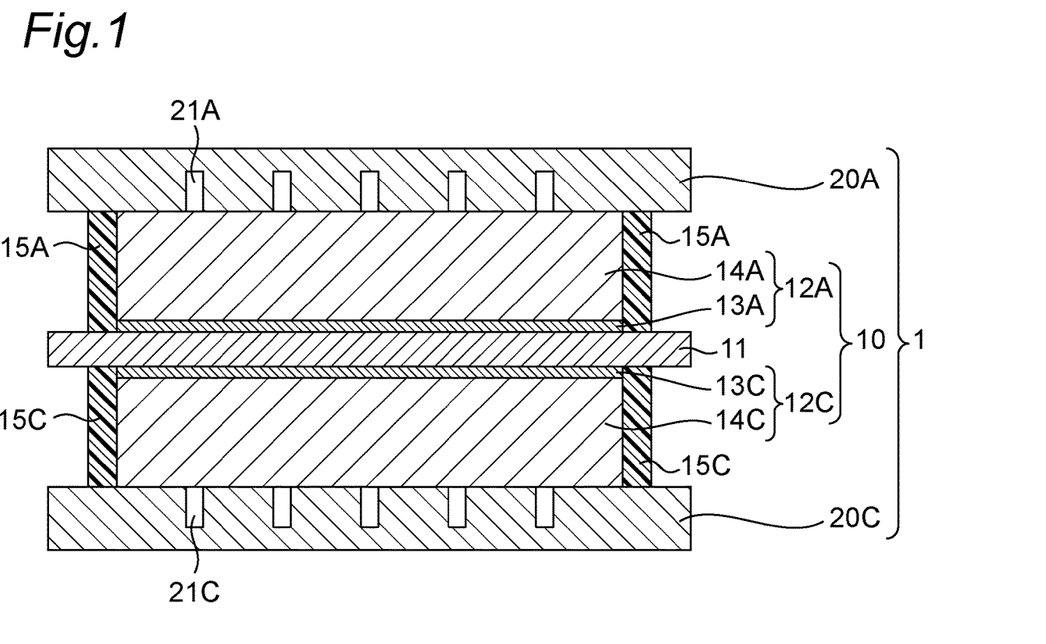
FIG. 1 is a sectional view showing a schematic configuration of a fuel-cell cell according to an embodiment of the present disclosure.
Figure 2:
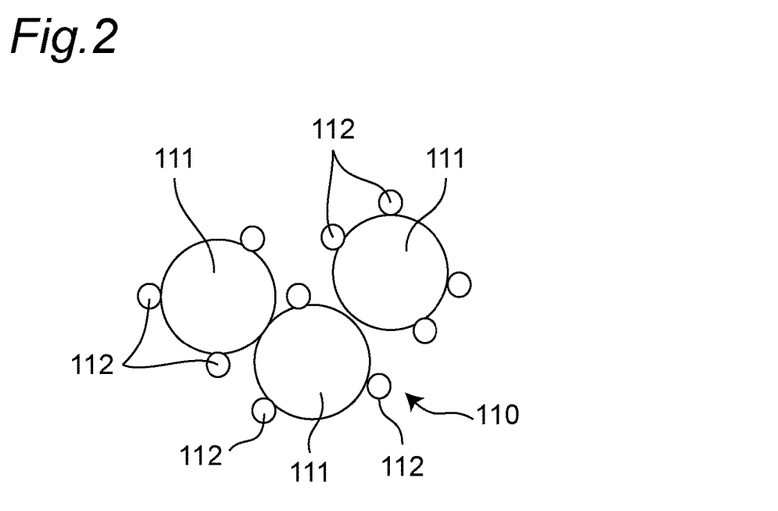
FIG. 2 is a schematic view showing a cathode catalyst of FIG. 1.

FIG. 1 is a sectional view showing a basic configuration of a fuel-cell cell 1 according to the embodiment of the present disclosure. FIG. 2 is a schematic view showing a cathode catalyst 110 in the fuel-cell cell 1. The fuel-cell cell 1 according to this embodiment is a polymer electrolyte fuel cell (solid polymer fuel cell). The polymer electrolyte fuel cell causes fuel gas containing hydrogen and an oxidizer gas containing oxygen such as air to electrochemically react with each other, to thereby generate electric power and heat at the same time. Note however that the present invention is not limited to the polymer electrolyte fuel cell but is applicable to various types of fuel cells.

The fuel-cell cell 1 according to this embodiment comprises, as shown in FIG. 1, an MEA 10, an anode separator 20A and a cathode separator 20C, and an anode-side sealing material 15A and a cathode-side sealing material 15C.

The MEA 10 includes an electrolyte membrane 11 (solid polymer electrolyte membrane) that selectively transports hydrogen ions and a pair of electrode layers formed on both surfaces of the electrolyte membrane 11. One (cathode side) of the pair of electrode layers is a cathode electrode 12C (air electrode) and the other (anode side) is an anode electrode 12A (fuel electrode).

The electrolyte membrane 11 is made of a material that has proton conductivity and that does not allow electrons to flow. The electrolyte membrane 11 is for example a perfluorosulfonic acid membrane, Nafion (registered trademark) manufactured by DuPont, Flemion (registered trademark) manufactured by Asahi Glass Co., Ltd., Aciplex (registered trademark) manufactured by Asahi Glass Co., Ltd., Gore Select (registered trademark) manufactured by Japan Gore-Tex, or a hydrocarbon-based resin such as polyimide having a proton conductive group. The electrolyte membrane 11 is made e.g. of the same material as a hydrogen ion conductive polymer used for a cathode catalyst layer 13C and an anode catalyst layer 13A. This can improve the hydrogen ion conductivity. The electrolyte membrane 11 may be made of a different material from the hydrogen ion conductive polymer used for the cathode catalyst layer 13C and the anode catalyst layer 13A.

The cathode electrode 12C includes the cathode catalyst layer 13C and a cathode gas diffusion layer 14C. The cathode catalyst layer 13C is laminated on a first-main-surface-side surface (first main surface) of the electrolyte membrane 11. The cathode gas diffusion layer 14C is laminated on the cathode catalyst layer 13C.

The anode electrode 12A includes the anode catalyst layer 13A and an anode gas diffusion layer 14A. The anode catalyst layer 13A is laminated on a second-main-surface-side surface (second main surface) of the electrolyte membrane 11. The anode gas diffusion layer 14A is laminated on the anode catalyst layer 13A.

The cathode catalyst layer 13C includes the cathode catalyst 110 (FIG. 2). As shown in FIG. 2, the cathode catalyst 110 is formed from catalyst particles 112 with a catalytic function carried on a carrier 111. Depending on the material used, the carrier 111 may include a plurality of carriers 111 present in an aggregated state. The catalyst particles 112 are carried on a surface of the carrier 111 or within carrier pores in the vicinity of the carrier surface. The anode catalyst layer 13A includes an anode catalyst having catalyst particles with a catalytic function carried on carriers. The catalyst particles with a catalytic function in the cathode catalyst layer 13C and the anode catalyst layer 13A are e.g. metal particles such as platinum particles or platinum alloy particles. In the cathode catalyst layer 13C and the anode catalyst layer 13A, the carrier has electron conductivity and is e.g. carbon powder, etc.

The anode gas diffusion layer 14A and the cathode gas diffusion layer 14C have functions of current collecting action, gas permeability, and water repellency. The anode gas diffusion layer 14A and the cathode gas diffusion layer 14C are e.g. a porous carbon material such as carbon cloth, carbon paper, or non-woven fabric. The anode gas diffusion layer 14A and the cathode gas diffusion layer 14C may be subjected appropriately to surface treatment so as to impart a hydrophilic function or a water-repellent function thereto.

The anode separator 20A is laminated on the second main surface side (anode electrode 12A side) of the MEA 10. The cathode separator 20C is laminated on the first main surface side (cathode electrode 12C side) of the MEA 10.

The anode separator 20A is e.g. partly impregnated in a peripheral portion of the anode gas diffusion layer 14A. The cathode separator 20C is e.g. partly impregnated in a peripheral portion of the cathode gas diffusion layer 14C. Hereby, the power generation durability and strength can be improved. The anode separator 20A and the cathode separator 20C are made of e.g. carbon, metal, etc.

The anode separator 20A has, on its main surface abutting against the anode gas diffusion layer 14A, a fuel gas flow path 21A for flowing fuel gas. The fuel gas flow path 21A includes e.g. a plurality of grooves substantially parallel to one another. The cathode separator 20C has, on its main surface abutting against the cathode gas diffusion layer 14C, an oxidizer gas flow path 21C for flowing oxidizer gas. The oxidizer gas flow path 21C includes e.g. a plurality of grooves substantially parallel to one another. The anode separator 20A and the cathode separator 20C may be disposed with a cooling water flow path (not shown) through which cooling water, etc. passes.

When fuel gas is supplied through the fuel gas flow path 21A to the anode electrode 12A and when oxidizer gas is supplied through the oxidizer gas flow path 21C to the cathode electrode 12C, an electrochemical reaction takes place, generating electric power and heat.

The anode-side sealing material 15A and the cathode-side sealing material 15C are members for preventing gas from leaking to the exterior. The anode-side sealing material 15A is a member for preventing fuel gas from leaking to the exterior between the anode separator 20A and the electrolyte membrane 11. The anode-side sealing material 15A is arranged so as to cover lateral surfaces (outside surfaces in the plane direction) of the anode catalyst layer 13A and the anode gas diffusion layer 14A. The cathode-side sealing material 15C is a member for preventing oxidizer gas from leaking to the exterior between the cathode separator 20C and the electrolyte membrane 11. The cathode-side sealing material 15C is arranged so as to cover lateral surfaces (outside surfaces in the plane direction) of the cathode catalyst layer 13C and the cathode gas diffusion layer 14C.

The anode-side sealing material 15A and the cathode-side sealing material 15C are e.g. thermoplastic resin, thermosetting resin, etc. The anode separator 20A and the cathode separator 20C are made of e.g. silicone resin, epoxy resin, melamine resin, polyurethane resin, polyimide resin, acrylic resin, ABS resin, polypropylene, liquid crystal polymer, polyphenylene sulfide resin, polysulfone, glass fiber reinforced resin, etc.

Figure 3:
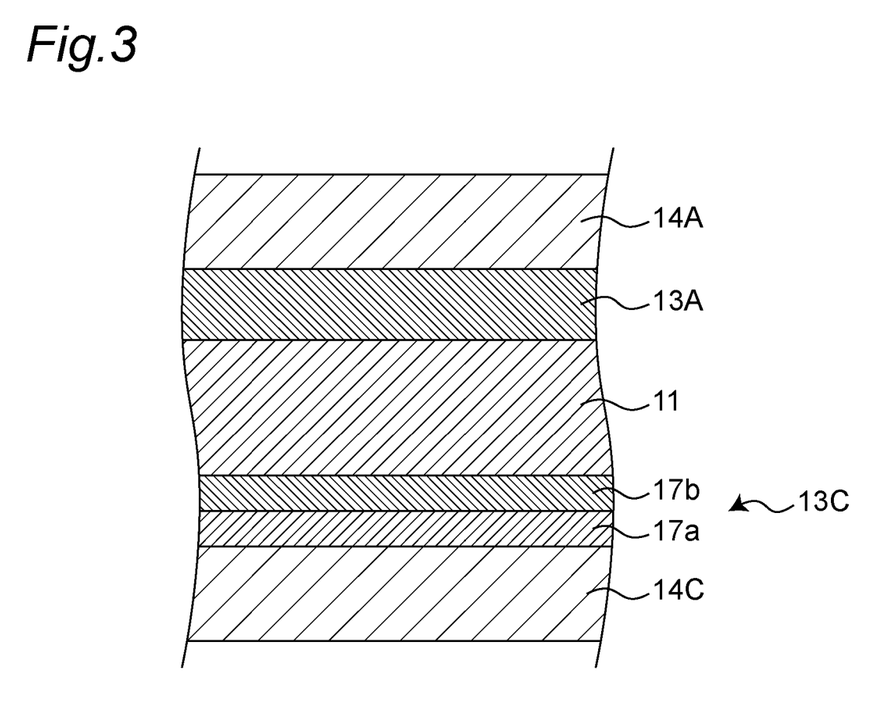
FIG. 3 is a sectional view showing a schematic configuration around an electrolyte membrane of FIG. 1.

The cathode electrode 12C will then be described in more detail with reference to FIG. 3. FIG. 3 is a sectional view showing a schematic configuration around the electrolyte membrane 11 of FIG. 1. The cathode electrode 12C is formed e.g. as a mixed membrane of a hydrogen ion conductive polymer and the cathode catalyst 110 having the catalyst particles 112 with a catalytic function carried on the carrier 111.

Here, for example, the carrier 111 is in the form of fine particles with electron conductivity and is not affected by the catalyst. The carrier 111 is a carbon particle of e.g. carbon black, graphite, graphite, activated carbon, carbon fiber, carbon nanotube, fullerene, etc. The average particle diameter of the carrier 111 (carbon particle) is e.g. 10 nm or more and 2,000 nm or less. By setting the average particle diameter of the carrier 111 (carbon particle) to 10 nm or more, an electron conduction path can easily be formed. By setting the average particle diameter of the carrier (carbon particle) to 2,000 nm or less, it is possible to prevent a decrease in gas diffusivity and a decrease in catalyst utilization rate.

The cathode catalyst 110 includes a water-repellent polymer material in at least part of the surface. That is, water repellent treatment is applied to at least part of the cathode catalyst 110. For example, the water repellent treatment is applied at least partly in the cathode catalyst 110 having platinum carried on carbon particles. As used herein, the water-repellent polymer material refers to a polymer material having a water repellent function.

The water-repellent polymer material is e.g. polyvinylidene fluoride, PTFE, fluoro(meth)acrylate-based resin, etc. The fluoro(meth)acrylate-based resin refers to a compound in which a fluoroalkyl group is present in an alcohol residue portion of (meth)acrylic acid ester. The fluoroalkyl group preferably has a perfluoroalkyl group i.e. a group in which all hydrogen atoms of the alkyl group are replaced with fluorine atoms, and preferably has the perfluoroalkyl group in at least its terminal portion. Examples of the structure of the terminal portion of the fluoroalkyl group include —CF2CF3, —CF(CF3)2, —CF2H, —CFH2, —CF2Cl, etc., and —CF2CF3 is preferable from the viewpoint of water repellency.

An etheric oxygen atom or a thioetheric sulfur atom may be inserted between carbon-carbon bonds in the fluoroalkyl group. The water-repellent polymer material may be an aromatic polymer material such as e.g. polyimide, polyamide, polybenzimidazole, polybenoxazole, or polybenzoxazine. The water-repellent polymer material may be e.g. silicone-based resin, siloxane-based resin, etc. In the case where the water-repellent polymer material is e.g. a fluorine-based material, an aromatic polymer, etc., material deterioration can further be suppressed.

The cathode catalyst layer 13C includes a plurality of catalyst layers. In this embodiment, the cathode catalyst layer 13C includes a first catalyst layer 17a and a second catalyst layer 17b. The second catalyst layer 17b is located closer to the electrolyte membrane 11 than the first catalyst layer 17a is.

In this embodiment, the particle diameter of the catalyst particles 112 of the cathode catalyst 110 included in the first catalyst layer 17a is larger than the particle diameter of the catalyst particles 112 of the cathode catalyst 110 included in the second catalyst layer 17b.

In the cathode catalyst layer 13C, a water contact angle (catalyst layer contact angle) on a surface in contact with the cathode gas diffusion layer 14C is e.g. 0 degrees or more and 120 degrees or less. In this embodiment, the surface of the cathode catalyst layer 13C in contact with the cathode gas diffusion layer 14C is a surface of the first catalyst layer 17a. In the cathode gas diffusion layer 14C, a water contact angle (GDL contact angle) on a surface in contact with the cathode catalyst layer 13C is e.g. 120 degrees or more. In this embodiment, the GDL contact angle is larger than the catalyst layer contact angle. The water contact angle is measured using e.g. a contact angle meter, etc.

The thickness of the cathode catalyst layer 13C is e.g. 3 μm or more and 30 μm or less.

Manufacturing Method of Fuel Cell Cell

A manufacturing method of the MEA 10 and a manufacturing method of the fuel-cell cell 1 according to the embodiment of the present invention will then be described with reference to FIG. 3.

First, the electrolyte membrane 11 according to the embodiment of the present invention is prepared. Next, the cathode electrode 12C and the anode electrode 12A are formed on both surfaces of the electrolyte membrane 11 prepared. The cathode electrode 12C and the anode electrode 12A are formed e.g. through confection of catalyst ink. The catalyst ink contains e.g. a hydrogen ion conductive polymer, a carbon carrier carrying thereon metal particles with a catalytic function, and a dispersion medium.

For example, the same material as that of the electrolyte membrane 11 is used for the hydrogen ion conductive polymer contained in the catalyst ink.

In the case of using Nafion (registered trademark) manufactured by DuPont as the electrolyte membrane 11, it is preferred to use Nafion (registered trademark) manufactured by DuPont as the hydrogen ion conductive polymer contained in the catalyst ink. In the case of using a material other than Nafion (registered trademark) as the electrolyte membrane 11, it is preferred to achieve optimization e.g. by dissolving the same components as those of the electrolyte membrane 11 in the catalyst ink.

A solvent used as the dispersion medium of the catalyst ink is not particularly limited as long as it can dissolve a proton conductive polymer in a highly fluid state and or can disperse it as a fine gel without eroding metal particles with a catalytic function or hydrogen ion conductive resin. The solvent preferably contains at least a volatile liquid organic solvent, but this is not particularly limitative. The solvent used as the dispersion medium of the catalyst ink can be e.g. alcohols such as methanol, ethanol, 1-propanol, 2-propanol, 1-butanol, 2-butanol, isobutyl alcohol, tert-butyl alcohol, pentanol, 2-heptanol, and benzyl alcohol; ketones such as acetone, methyl ethyl ketone, methyl propyl ketone, methyl butyl ketone, methylisobutyl ketone, methylamyl ketone, pentanone, heptanone, cyclohexanone, methylcyclohexanone, acetonylacetone, diethylketone, dipropylketone, and diisobutylketone; ethers such as tetrahydrofuran, tetrahydropyran, dioxane, diethylene glycol dimethyl ether, anisole, methoxytoluene, diethyl ether, dipropyl ether, and dibutyl ether; amines such as isopropylamine, butylamine, isobutylamine, cyclohexylamine, diethylamine, and aniline; esters such as propyl formate, isobutyl formate, amyl formate, methyl acetate, ethyl acetate, propyl acetate, butyl acetate, isobutyl acetate, pentyl acetate, isopentyl acetate, methyl propionate, ethyl propionate, and butyl propionate; and other polar solvents such as acetic acid, propionic acid, dimethylformamide, dimethylacetamide, N-methylpyrrolidone, ethylene glycol, diethylene glycol, propylene glycol, ethylene glycol monomethyl ether, ethylene glycol dimethyl ether, ethylene glycol diethyl ether, diacetone alcohol, and 1-methoxy-2-propanol, and two or more of these solvents may be mixed for use.

By using two types of solvents with different permittivities among these solvents, it is possible to control the dispersion state of hydrogen ion conductive resin in the catalyst ink. In the case of using lower alcohol as these solvents, use in the form of a mixed solvent with water is preferred. The solvent may contain e.g. water that is familiar with the hydrogen ion conductive resin. The amount of water added can be e.g. in the range where there is no adverse effect such as the proton conductive polymer separating out to cause white turbidity or gelatinization.

The viscosity of catalyst ink is preferably e.g. 0.1 cP or more and 100 cP or less. The viscosity is optimized e.g. by changing the type of solvent and the solid content concentration. The viscosity control is feasible also by adding a dispersant when dispersing the ink.

Dispersion treatment is appropriately applied by a known method to the catalyst ink containing the hydrogen ion conductive resin, the carbon carrier carrying thereon metal particles with a catalytic performance, and the dispersion medium.

The cathode electrode 12C, the anode electrode 12A, and the electrolyte membrane 11 are bonded together by thermocompression bonding. In the fuel-cell cell 1 according to the embodiment of the present invention, the cathode gas diffusion layer 14C and the anode gas diffusion layer 14A, and the cathode separator 20C and the anode separator 20A may be ones for use in ordinary fuel cells. The fuel cell is manufactured by assembling together other accompanying devices such as a gas supply device and a cooling device.

A comparative example and examples of the present invention will hereinafter be described with reference to FIG. 4. The comparative example and the examples are results of experiments using the fuel-cell cell 1. As will be described later, the configuration of the fuel-cell cell 1 is partly changed in Comparative Example 1 and Example 1. The present invention is not limited to the following examples.

Comparative Example 1

Figure 5:
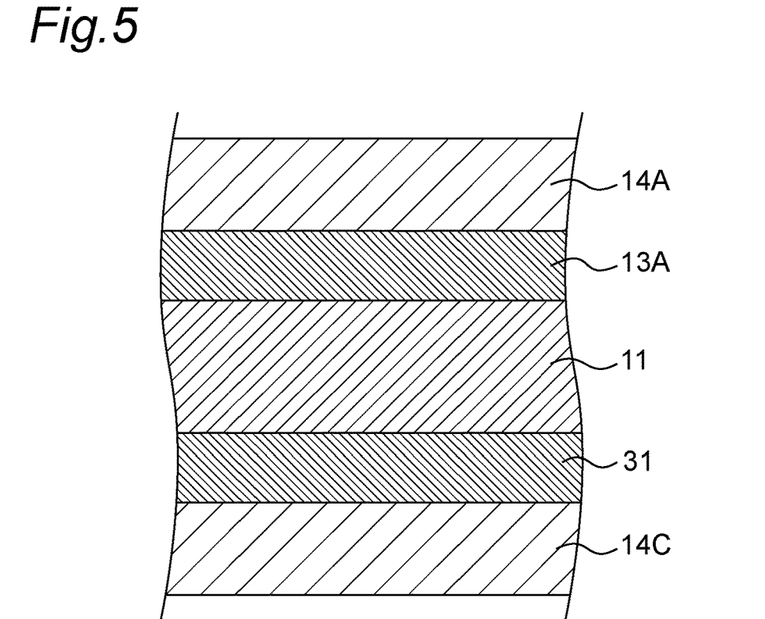
FIG. 5 is a sectional view showing a schematic configuration around the electrolyte membrane in the case of a cathode catalyst layer having a different configuration from that of FIG. 3.

Referring to FIG. 5, Comparative Example 1 will be described. FIG. 5 is a sectional view showing a schematic configuration around the electrolyte membrane 11 in the case of a cathode catalyst layer having a different configuration from that of FIG. 3. A cathode catalyst layer 31 of FIG. 5 corresponds to the cathode catalyst layer 13C of the fuel-cell cell 1. In Comparative Example 1, as shown in FIG. 5, the cathode catalyst layer 31 had a one-layer structure. Here, commercially available catalyst TEC10E50E (manufactured by Tanaka Kikinzoku Kogyo K.K.) was used as the catalyst of the cathode catalyst layer 13C.

Example 1

Example 1 will be described with reference to FIG. 5. In Example 1, as shown in FIG. 5, the cathode catalyst layer 31 had a one-layer structure.

A commercially available catalyst undergoing water repellent treatment was used as the catalyst of the cathode catalyst layer 31. Specifically, a commercially available catalyst and a water-repellent polymer material were dissolved and dispersed in a predetermined solvent and, after stirring for a certain period of time, were dried to remove the solvent sufficiently, to thereby fabricate the cathode catalyst layer 31. As a result, the surface of the catalyst was coated with the water-repellent polymer material. A fluorine-based polymer material was used as the water-repellent polymer material. The administration amount of the fluorine-based polymer material was 5-15% of that of the commercially available catalyst. TEC10E50E (manufactured by Tanaka Kikinzoku Kogyo K.K.) was used as the commercially available catalyst. EGC-1700 (manufactured by Sumitomo 3M Ltd.) was used as the fluorine-based polymer material. The fluorine-based polymer material to be used may be materials such as polytetrafluoroethylene and polyvinylidene commercially available as fluororesins and fluorine surfactants.

Example 2

Example 2 will be described with reference to FIG. 3. In Example 2, as shown in FIG. 3, the structure of the cathode catalyst layer 13C was a two-layer structure.

The catalyst used for the first catalyst layer 17a was a catalyst obtained by sintering commercially available TEC10E50E at 200 to 400° C. to increase the diameter of the catalyst particles 112 (metal particles) of the catalyst in advance. The catalyst of the second catalyst layer 17b was a commercially available catalyst subjected to the same water repellent treatment as that of Example 1. After subjecting this catalyst to the water repellent treatment described in Example 1, the first catalyst layer 17a and the second catalyst layer 17b were formed.

Here, the catalyst particles 112 (metal particles) of the catalyst used for the first catalyst layer 17a had an average particle diameter of 4 to 6 nm, while the catalyst particles 112 (metal particles) of the catalyst used for the second catalyst layer 17b had an average particle diameter of 2 to 4 nm.

Example 3

Example 3 will be described with reference to FIG. 3. In Example 3, as shown in FIG. 3, the structure of the cathode catalyst layer 13C was a two-layer structure. Difference from Example 2 lies in that the administration amount of the fluorine-based polymer material in the water repellent treatment was 15-30% of that of the commercially available catalyst.

Evaluation of Contact Angle of Catalyst Layer and GDL

The water contact angle was measured as evaluation of wettability of the cathode catalyst layers 13C and 31 and the cathode gas diffusion layer 14C in Comparative Example 1 and Examples 1 to 3. As to the cathode gas diffusion layer 14C, the contact angle (GDL contact angle) on a surface in contact with the cathode catalyst layers 13C and 31 was measured by measuring a contact angle of water within 10 seconds after dropping a predetermined amount of water droplets. As to the cathode catalyst layers 13C and 31, the contact angle (catalyst layer contact angle) on a surface in contact with the cathode gas diffusion layer 14C was measured by measuring a contact angle of water within 10 seconds after dropping a predetermined amount of water droplets.

Power Generation Evaluation Conditions for Fuel-Cell Cell for Evaluation

Power generation evaluation was carried out using the fuel-cell cell 1 described in the embodiment. Here, the power generation evaluation was performed by measuring a voltage when power was generated under conditions of a cell temperature of 80° C., a dew point temperature of 65° C. on the cathode and anode sides, oxygen and hydrogen utilization rates of 50 to 70%, and a current density of 0.2 A/cm$^2$. The cathode catalyst layer 13C and the anode catalyst layer 13A were created so as to have an area of 36 cm$^2$. Assuming a current density used in household fuel cells, the current density was set to 0.2 A/cm$^2$. In this embodiment, the above current density is not limitative.

A durability test was carried out by repeating one cycle of operation. Here, one cycle of operation was such that while supplying oxygen gas and hydrogen gas, power generation was continued for a certain period of time at the current density of 0.2 A/cm$^2$ and that, thereafter, by stopping the gas supply, power generation was stopped and left for a certain period of time. After 2000 cycles of operation, the generated power voltage at the current density of 0.2 A/cm$^2$ was measured. The generated power voltage at this time was defined as a generated power voltage after endurance. The amount of voltage change was defined as a difference between an initial generated power voltage (generated power voltage in a first cycle) and the generated power voltage after endurance. Specifically, the amount of voltage change was defined as a value obtained by subtracting the initial generated power voltage from the generated power voltage after endurance.

Figure 4:
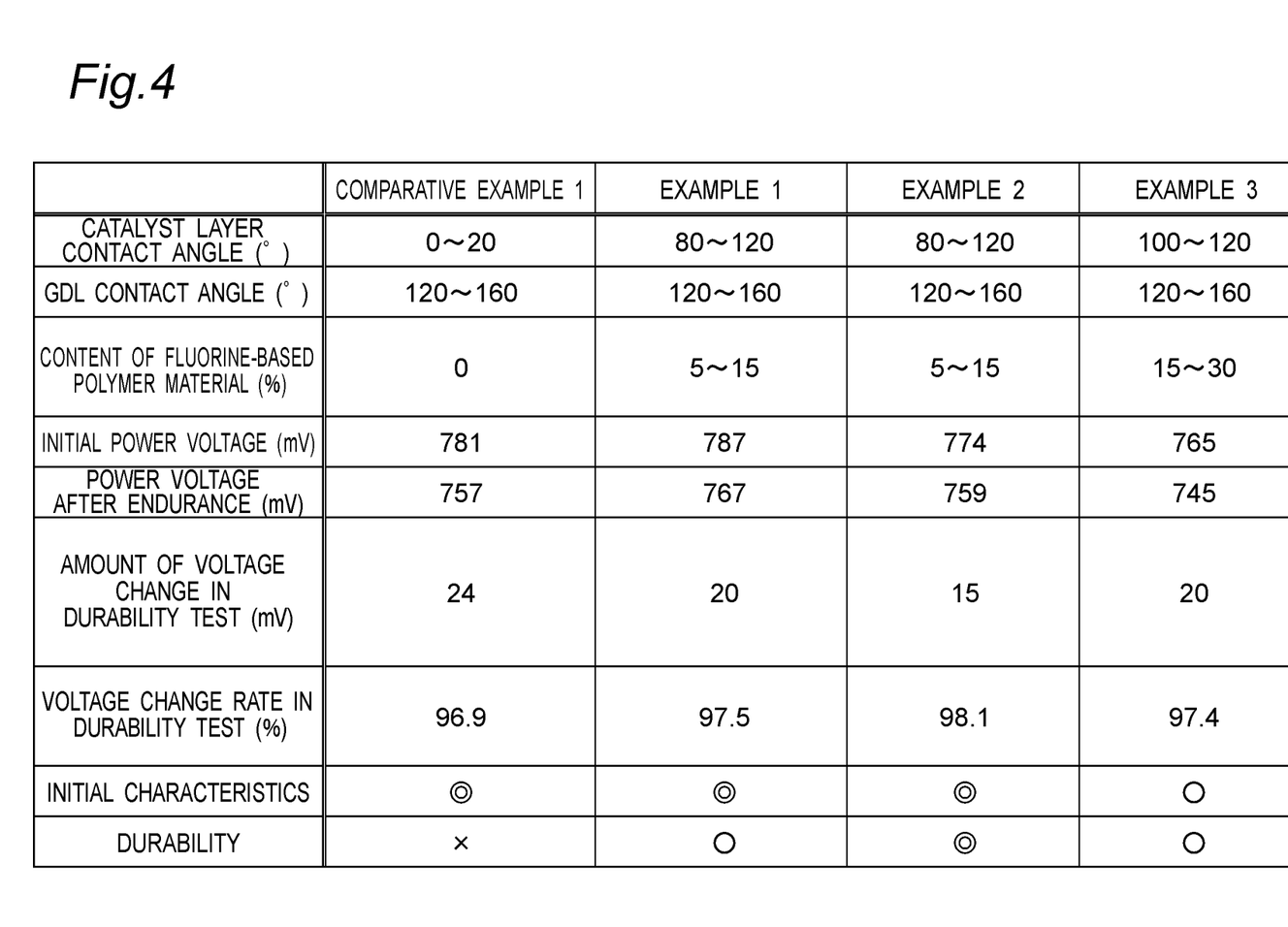
FIG. 4 is a view for explaining a comparative example and examples of the present disclosure.

As shown in FIG. 4, ones with an initial generated power voltage of 770 mV or more were marked with ⊚, while one with 760 mV or more and less than 770 mV was marked with ○. In durability, one having a voltage change rate of 98% or more due to the durability test was marked with ⊚, ones with a voltage change rate of 97% or more and less than 98% were marked with ○, and one with a voltage change rate of less than 97% was marked with x.

Results

When comparing Comparative Example 1 and Example 1, it can be seen that Example 1 has a higher catalyst layer contact angle by virtue of water repellent treatment of the catalyst. As a result, the initial generated power voltage was improved by 6 mV with a tendency of reduction of the voltage change rate (the amount of voltage change) due to the durability test. It is considered that this is because the effect of water repellent treatment of the catalyst was obtained.

Here, when observing the size of the electrode metal particles after the durability test by turning on/off the power generation, a remarkable difference was found between Comparative Example 1 and Example 1.

Comparative Example 1 showed a relationship that in the thickness direction of the cathode catalyst layer 13C, the catalyst particles 112 toward the electrolyte membrane 11 had a larger particle diameter whereas the catalyst particles 112 toward the cathode gas diffusion layer 14C had a smaller particle diameter. In Example 1, on the other hand, it was found that there was a relationship that in the thickness direction of the cathode catalyst layer 13C, the catalyst particles 112 toward the electrolyte membrane 11 had a smaller particle diameter whereas the catalyst particles 112 toward the cathode gas diffusion layer 14C had a larger particle diameter. Specifically, while the average particle diameter of the catalyst particles 112 was 1.5 nm at the initial stage, in Comparative Example 1 the average particle diameter of the catalyst particles 112 toward the electrolyte membrane 11 in the thickness direction of the cathode catalyst layer 13C was 4.1 nm and the average particle diameter of the catalyst particles 112 toward the cathode gas diffusion layer 14C was 3.6 nm. In Example 1, the average particle diameter of the catalyst particles 112 toward the electrolyte membrane 11 was 3.0 nm and the average particle diameter of the catalyst particles 112 toward the cathode gas diffusion layer 14C was 3.5 nm.

The mechanism of this phenomenon is considered as follows. By on/off operations in the durability test, at the time of power generation, oxygen as an oxidizer gas is supplied via the cathode gas diffusion layer 14C to the cathode catalyst layer 31 and is consumed for power generation. Here, once the power generation is stopped, water in the cathode catalyst layer 31 is reduced and the cathode catalyst layer 31 becomes dry. For this reason, when power generation is resumed, a humidified gas is supplied via the cathode gas diffusion layer 14C to the cathode catalyst layer 31. At this time, it is considered that when the catalyst layer contact angle is high i.e. when the water wettability of the cathode catalyst layer 31 is low, gas is not easily supplied to the electrolyte membrane 11 side, allowing power generation to occur on the cathode gas diffusion layer 14C side in the cathode catalyst layer 31. That is, it is considered that by performing water repellent treatment, power generation load in the on/off operation test concentrates on the cathode gas diffusion layer 14C side in the cathode catalyst layer 31, with the result that elution of platinum in the relevant part becomes active, causing the change in particle diameter of the catalyst particles 112.

That is, in the case where the catalyst water repellent treatment is not performed, it is presumed that eluted Pt ions easily diffuse toward the electrolyte membrane 11 because of the presence of the power generation load point on the electrolyte membrane 11 side. On the contrary, in the case where the catalyst water repellent treatment is performed, it is presumed that diffusion of eluted Pt ions toward the electrolyte membrane 11 becomes difficult to occur because of the presence of the power generation load point on the cathode gas diffusion layer 14C side.

Next, when comparing Example 1 and Example 2, the amount of voltage change due to the durability test decreases although the initial voltage drops slightly. It is considered that this is because elution of platinum occurring in the above mechanism was suppressed by virtue of the particle stability improved by imparting the two-layer structure to the cathode catalyst layer 13C to allow the catalyst particles 112 (metal particles) in the catalyst layer (first catalyst layer 17a) toward the cathode gas diffusion layer 14C to have an increased diameter in advance. As a result, the amount of voltage change due to the durability test could be suppressed.

In Example 3, as compared with Example 2, the initial voltage drops and the amount of voltage change due to the durability test also increases. This revealed that the ratio of the fluorine-based polymer added to the commercially available catalyst is more preferably 5 to 15%.

In Examples 1 to 3, the GDL contact angle is larger than the catalyst layer contact angle. Consequently, water generated in the cathode catalyst layer 13C is promptly removed through the cathode gas diffusion layer 14C so that retention of water in the cathode catalyst layer 13C can be suppressed. This can suppress elution of Pt caused by retention of water in the cathode catalyst layer 13C.

In the case where the catalyst layer contact angle is larger than the GDL contact angle, as compared with the case of the catalyst layer contact angle smaller than the GDL contact angle, a tendency was found where the amount of voltage change due to the durability test increases with a drop of the initial amount of power generation. In the case where the catalyst layer contact angle is larger than the GDL contact angle, it becomes hard to promptly remove via the cathode gas diffusion layer 14C water generated in the cathode catalyst layer 13C. It is thus preferred that the GDL contact angle be larger than the catalyst layer contact angle (the catalyst layer contact angle be smaller than the GDL contact angle). That is, when the catalyst layer contact angle is 80° to 120°, the GDL contact angle is preferably 120° or more.

The balance with the supplied gas in the thickness direction of the cathode catalyst layer 13C is important for the above contents. For example, a more preferred effect can be obtained by setting the thickness of the cathode catalyst layer 13C within a predetermined range.

For example, when the thickness of the cathode catalyst layer 13C (the total thickness of the first catalyst layer 17a and the second catalyst layer 17b) is 3 μm or more, a difference can easily be obtained in the gas supply state in the thickness direction. When the thickness of the cathode catalyst layer 13C (the total thickness of the first catalyst layer 17a and the second catalyst layer 17b) is 30 μm or less, the amount of catalyst used in the catalyst layer can be reduced, resulting in a cost reduction. Accordingly, the thickness of the cathode catalyst layer 13C is desirably 3 μm or more and 30 μm or less.

Furthermore, the lower the degree of humidification of the supplied gas, the easier it is to obtain the above-described effects. For example, the condition of the relative humidity within the power generation cell of the fuel cell being 80% or less makes it easy to obtain the effects of the present invention. Desirably, the condition of 70% or less makes it easier to obtain the effects of the present invention. If the degree of humidification is too low, it cannot generate electricity as a fuel cell, and hence electricity is desirably generated under the condition of e.g. 5% or more in relative humidity. This range of 5 to 80% in relative humidity brings about an effect expectable in fuel cells e.g. for moving objects such as forklifts and ships.

The fuel-cell cell 1 according to this embodiment includes the electrolyte membrane 11, the cathode catalyst layer 13C, the cathode gas diffusion layer 14C, the anode catalyst layer 13A, and the anode gas diffusion layer 14A. The cathode catalyst layer 13C is laminated on the first main surface side of the electrolyte membrane 11. The cathode gas diffusion layer 14C is laminated on the cathode catalyst layer 13C. The anode catalyst layer 13A is laminated on the second main surface side of the electrolyte membrane 11. The anode gas diffusion layer 14A is laminated on the anode catalyst layer 13A. The cathode catalyst layer 13C includes the cathode catalyst having the catalyst particles 112 with a catalytic function carried on the carrier 111. The cathode catalyst layer 13C includes a water-repellent polymer material in at least part of the surface.

According to this configuration, retention of water in the cathode catalyst layer 13C can be suppressed because the cathode catalyst layer 13C has a water repellency. This can reduce elution of the catalyst particles 112 (e.g. PT, etc.) with a catalytic function into the electrolyte membrane.

The cathode catalyst layer 13C includes the first catalyst layer 17a and the second catalyst layer 17b positioned closer to the electrolyte membrane 11 than the first catalyst layer 17a is. The particle diameter of the catalyst particles 112 of the cathode catalyst 110 included in the first catalyst layer 17a is larger than the particle diameter of the catalyst particles 112 of the cathode catalyst included in the second catalyst layer 17b.

According to this configuration, the particle stability is improved by allowing the catalyst particles 112 of the cathode catalyst 100 included in the first catalyst layer 17a to have an increased particle diameter in advance, whereupon it is possible to reduce elution of the catalyst particles 112 (e.g. Pt, etc.) with a catalytic function into the electrolyte membrane 11.

The water contact angle on a surface of the cathode gas diffusion layer 14C in contact with the cathode catalyst layer 13C is 120 degrees or more.

This structure can further reduce elution of the catalyst particles 112 with a catalytic function into the electrolyte membrane 11.

The water contact angle on a surface of the cathode catalyst layer 13C in contact with the cathode gas diffusion layer 14C is 0 degrees or more and 120 degrees or less.

This structure can further reduce elution of the catalyst particles 112 with a catalytic function into the electrolyte membrane 11.

The water contact angle on a surface of the cathode gas diffusion layer 14C in contact with the cathode catalyst layer 13C is larger than the water contact angle on a surface of the cathode catalyst layer 13C in contact with the cathode gas diffusion layer 14C.

According to this configuration, in the case where the GDL contact angle is larger than the catalyst layer contact angle, water generated in the cathode catalyst layer 13C can promptly be removed through the cathode gas diffusion layer 14C. This can further reduce elution of the catalyst particles 112 with a catalytic function into the electrolyte membrane 11.

The cathode catalyst layer has a thickness of 3 μm or more and 30 μm or less.

This configuration can further reduce elution of the catalyst particles 112 with a catalytic function into the electrolyte membrane 11. It can also suppress the manufacturing cost of the cathode catalyst layer 13C.

The power generation driving condition is 5% or more and 70% or less in relative humidity.

This can further reduce elution of the catalyst particles 112 with a catalytic function into the electrolyte membrane 11.

According to the fuel cell of this embodiment, it includes a plurality of fuel-cell cells 1.

Consequently, in the fuel cell including the plurality of fuel-cell cells 1, elution of the catalyst particles 112 with a catalytic function into the electrolyte membrane 11 can further be reduced.

The present disclosure is not limited to the above embodiment, but can be carried out in various other modes. Although in the above embodiment the fuel gas flow path 21A has been disposed on the anode separator 20A, the present disclosure is not limited thereto. For example, the fuel gas flow path 21A may be disposed on the anode gas diffusion layer 14A. In this case, the anode separator 20A may be of a flat plate shape.

Although in the above embodiment the oxidizer gas flow path 21C has been disposed on the cathode separator 20C, the present disclosure is not limited thereto. For example, the oxidizer gas flow path 21C may be disposed on the cathode gas diffusion layer 14C. In this case, the cathode separator 20C may be of a flat plate shape.

In place of the anode separator 20A and the cathode separator 20C, a separator may be arranged between the anode separator 20A and the cathode separator 20C so as to cover the lateral surfaces of the electrolyte membrane 11, the anode catalyst layer 13A, the anode gas diffusion layer 14A, the cathode catalyst layer 13C, and the cathode gas diffusion layer 14C. This can suppress deterioration of the electrolyte membrane 11 and improve handleability of the MEA10 and workability at the time of mass production.

The present disclosure may be e.g. a fuel cell formed by stacking a plurality of fuel-cell cells 1. For example, the fuel-cell cells 1 stacked on top of each other are pressurized and fastened at a predetermined fastening pressure by fastening members (not shown) such as bolts. This can prevent fuel gas and oxidizer gas from leaking to the exterior and also can reduce the contact resistance in the fuel cell.

Although the particle diameter of the catalyst particles 112 of the cathode catalyst 110 included in the first catalyst layer 17a has been set to be larger than the particle diameter of the catalyst particles 112 of the cathode catalyst 110 included second catalyst layer 17b, this is not limitative as long as the cathode catalyst 110 includes a water-repellent polymer material in at least part of the surface.

The cathode catalyst may be so formed that the average particle diameter of the catalyst particles 112 of the cathode catalyst 110 included in the first catalyst layer 17a is larger than the average particle diameter of the catalyst particles 112 of the cathode catalyst 110 included in the second catalyst layer 17b. This also makes it possible to improve the stability of the particles to thereby reduce elution of the catalyst particles 112 into the electrolyte membrane 11.

The catalyst particles 112 are not limited to metal particles as long as they are particles having a catalytic function. The carrier 111 is not limited to the carbon particle as long as it can carry the catalyst particles 112 thereon.

The fuel-cell cell according to the present disclosure is useful in the case of repeating the ON/OFF operation of power generation.

EXPLANATIONS OF LETTERS OR NUMERALS 1 fuel-cell cell
11 electrolyte membrane
12A anode electrode
12C cathode electrode
13A anode catalyst layer
13C cathode catalyst layer
14A anode gas diffusion layer
14C cathode gas diffusion layer
17a first catalyst layer
17b second catalyst layer
20A anode separator
20C cathode separator
21A fuel gas flow path
21C oxidizer gas flow path
100 electrolyte membrane
101 anode catalyst layer
102 cathode catalyst layer
103 anode gas diffusion layer
104 cathode gas diffusion layer
110 cathode catalyst
111 carrier
112 catalyst particle

The invention claimed is:

1. A fuel-cell cell comprising:
an electrolyte membrane;
a cathode catalyst layer laminated on a first main surface side of the electrolyte membrane;
a cathode gas diffusion layer laminated on the cathode catalyst layer;
an anode catalyst layer laminated on a second surface side of the electrolyte membrane; and
an anode gas diffusion layer laminated on the anode catalyst layer, wherein
the cathode catalyst layer includes a cathode catalyst in which catalyst particles with a catalytic function are carried on a carrier, and
the cathode catalyst includes a water-repellent polymer material in at least part of a surface thereof,
wherein
the cathode catalyst layer comprises:
a first catalyst layer, and
a second catalyst layer positioned closer to the electrolyte membrane than the first catalyst layer, and
the catalyst particles of the cathode catalyst included in the first catalyst layer have a particle diameter larger than that of the catalyst particles of the cathode catalyst included in the second catalyst layer.

2. The fuel-cell cell according to claim 1, wherein the cathode gas diffusion layer has a water contact angle of 120 degrees or more on a surface in contact with the cathode catalyst layer.

3. The fuel-cell cell according to claim 1, wherein the cathode catalyst layer has a water contact angle of 0 degrees or more and 120 degrees or less on a surface in contact with the cathode gas diffusion layer.

4. The fuel-cell cell according to claim 1, wherein a water contact angle on a surface of the cathode gas diffusion layer in contact with the cathode catalyst layer is larger than the water contact angle on a surface of the cathode catalyst layer in contact with the cathode gas diffusion layer.

5. The fuel-cell cell according to claim 1, wherein the cathode catalyst layer has a thickness of 3 μm or more and 30 μm or less.

6. The fuel-cell cell according to claim 1, wherein a power generation driving condition is 5% or more and 70% or less in relative humidity.

7. A fuel cell comprising a plurality of fuel-cell cells according to claim 1.

* * * * *